H. T. SEBURN.
GRAIN SAVING DEVICE FOR THRESHING MACHINES.
APPLICATION FILED AUG. 17, 1915.

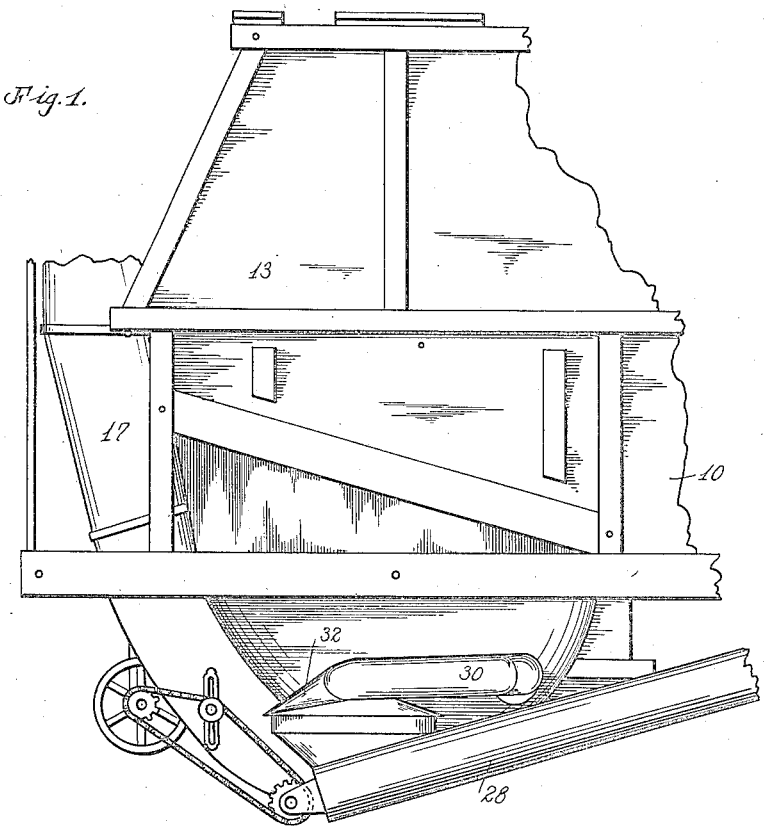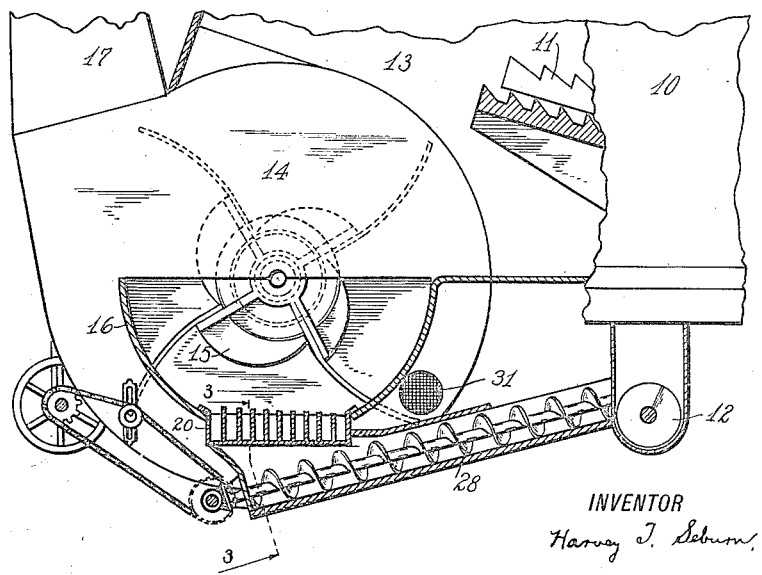

1,181,350.

Patented May 2, 1916.
2 SHEETS—SHEET 2.

WITNESSES:

INVENTOR
Harvey T. Seburn,
BY James A. Walsh,
ATTORNEY

UNITED STATES PATENT OFFICE.

HARVEY T. SEBURN, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

GRAIN-SAVING DEVICE FOR THRESHING-MACHINES.

1,181,350.  Specification of Letters Patent.  Patented May 2, 1916.

Application filed August 17, 1915. Serial No. 45,976.

*To all whom it may concern:*

Be it known that I, HARVEY T. SEBURN, a citizen of the United States, residing at Indianapolis, in the county of Marion and State of Indiana, have invented certain new and useful Improvements in Grain-Saving Devices for Threshing-Machines, of which the following is a specification.

My invention relates to improvements in the Sharpe grain saving device for threshing machines, and more specifically to the grain trap forming a part thereof, which I provide in a more durable, inexpensive and efficient form than at present devised, and is readily applicable in the construction of a machine embodying said grain saver, as will be hereinafter more fully pointed out.

Figure 3:
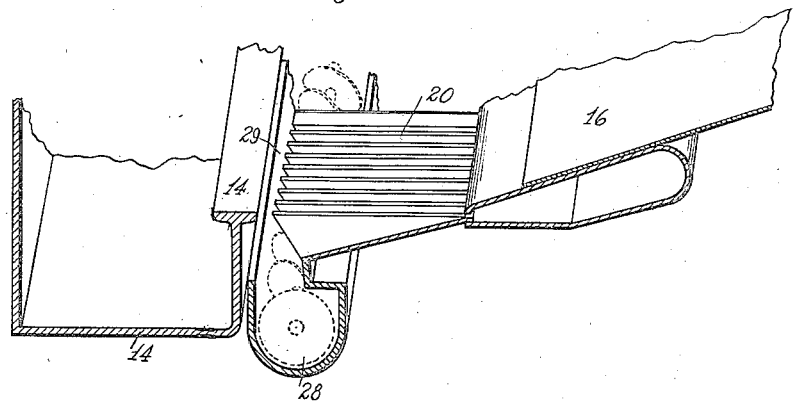
Figure 4:
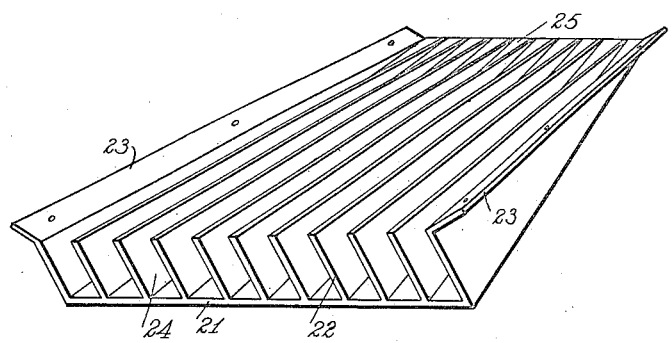

In the accompanying drawings, which form a part hereof, Figure 1 is a side elevation of a wind stacker forming part of a threshing machine; Fig. 2, a longitudinal section thereof; Fig. 3, a perspective of a portion of the interior of said stacker, and Fig. 4, a perspective of my improved grain trap.

In said drawings the portions marked 10 indicate a threshing machine including the usual straw carrier, 11, and tailings auger, 12. The wind stacker attached to said machine may be of any approved design and includes a straw chamber, 13, fan casing, 14, fan, 15, hopper, 16, and stacker chute, 17, all of an ordinary and well known form.

My improved grain trap, 20, comprises a one piece structure embodying a floor, 21, a plurality of partitions, 22, and wings, 23, the latter being provided for assembling the same with the hopper 16, said partitions being of a uniform thickness from top to bottom, so that the channels, 24, therebetween will be of a uniform width throughout their length. As will be observed by reference to Figs. 3 and 4, the partitions 22 gradually increase in height from the forward end, 25, of the trap, to the opposite end, which latter ends incline forwardly substantially as indicated in Fig. 3, so that the outlet point of the channels will lie slightly in advance of the axial line of a conveyer auger, 28, and the opening, 29, between fan casing 14 and the end of said trap will gradually increase in width. It will be further noted, Fig. 2, that the partitions 22 gradually increase from the forward toward the rear of the opening in fan casing 14, for a purpose which will hereinafter appear. I also employ the usual auxiliary blast pipe, 30, which is attached to the fan casing at 31, and is so arranged as to distribute a blast through nozzle, 32, across the grain trap 20 for accelerating the movement of material into and across said trap in a well known manner.

In the operation of a threshing machine it will be understood that the straw discharging from the carrier 11, and chaff, dust, etc., from other parts of the machine, are carried into the wind stacker hopper 16 and thence withdrawn by the fan 15, and discharged through the chute 17, onto the straw stack. In the progress of its travel to the fan the material comes within the influence of the blast from pipe 30, which accelerates its movement into the fan eye, and at the same time winnows the loose grains and unthreshed heads of grain from the straw and chaff, which grain is caught in the channels of the trap 20 and discharged therefrom into a conveyer, such as auger 28, and conveyed to the tailings auger 12, to be returned to the thresher and recleaned, and thus saved from waste in the straw stack, to which it would have otherwise been conveyed by the stacker fan and chute. By inclining the end of the trap adjacent the stacker fan as indicated, ample clearance is provided for the free passage of grain, or light and fluffy material mingled therewith, into the auger below; and by increasing the height of the partitions 22 from the forward to the rear side of the fan eye, material which falls into the forward part of the trap, some times being sluggish because of dampness or heaviness, momentarily fills up one or more of the channels to the point of overloading, under which condition when the material is entering the hopper very rapidly, the surplus in one channel will fall over into the next, so that too large a volume thereof to be handled by the blast from pipe 30 will not be contained in any one channel.

My improved grain trap in its present form being of a single casting, is highly durable and not subject to distortion, as it will sustain the weight of an operator who must sometimes enter the stacker hopper, or the weight of pulleys and other accessories loaded into the hopper when the stacker is shipped separately in knocked-down condition.

I claim as my invention:

1. In a grain saving device for threshing machines, a grain trap including a floor, and partitions associated with said floor and forming therewith channels for trapping grain, said partitions being of gradually increasing height transversely of said floor.

2. In a grain saving device for threshing machines, a grain trap including an inclined floor and a plurality of inclined partitions associated with said floor and forming therewith channels for trapping grain, said partitions graduating in height transversely of said floor from one side of said trap to the other.

3. In a grain saving device for threshing machines, a grain trap including an inclined floor, a plurality of partitions associated with said floor and forming therewith channels for trapping grain, said partitions being of gradually increasing height transversely of said floor and of uniform thickness throughout their length, and assembling wings associated with said partitions.

In testimony whereof I affix my signature in presence of two witnesses.

HARVEY T. SEBURN.

Witnesses:
 LEE R. GARBER,
 CHARLES D. MORRISON.